Figure 4:
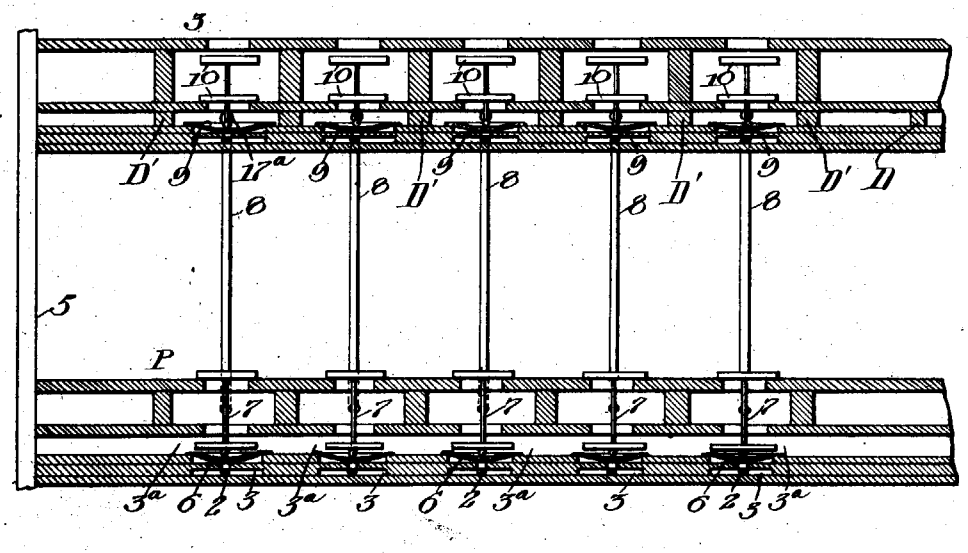

H. PIERCE.
VALVE SYSTEM AND TRACKER BOARD.
APPLICATION FILED JUNE 24, 1910.
Reissued Dec. 3, 1912.
13,492.
2 SHEETS—SHEET 1.
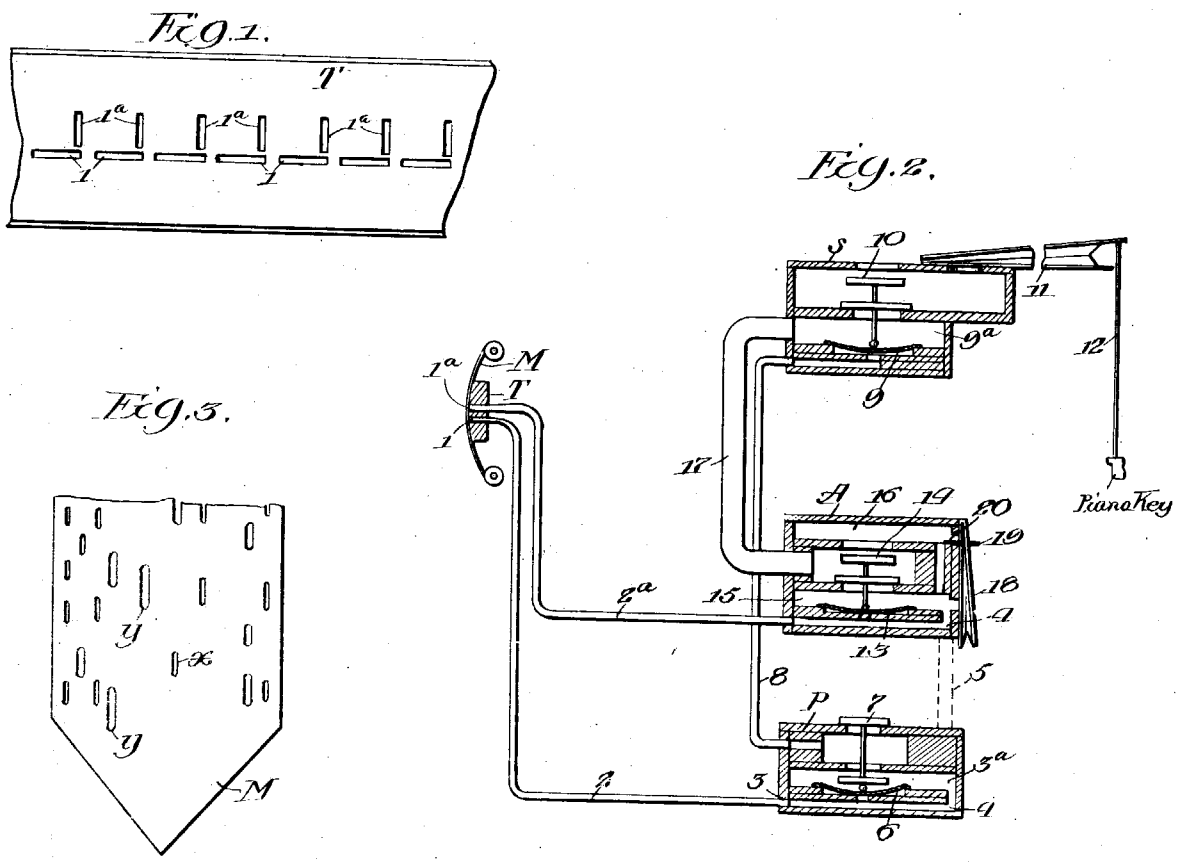
Witnesses
C. M. Hennick
A. Lyda Jones
Inventor
Harry Pierce
by A. Milar Bayne
Atty

H. PIERCE.

VALVE SYSTEM AND TRACKER BOARD.

APPLICATION FILED JUNE 24, 1910.

Reissued Dec. 3, 1912.

13,492.

2 SHEETS—SHEET 2.

Witnesses
Om Yennich
A. Lyda Jones

Inventor
Harry Pierce
by A. Miller Reynolds
Atty

UNITED STATES PATENT OFFICE.

HARRY PIERCE, OF KANSAS CITY, MISSOURI, ASSIGNOR, BY MESNE ASSIGNMENTS, TO THE CABLE COMPANY, OF CHICAGO, ILLINOIS, A CORPORATION OF ILLINOIS.

VALVE SYSTEM AND TRACKER-BOARD.

13,492. Specification of Reissued Letters Patent. Reissued Dec. 3, 1912.

Original No. 899,469, dated September 22, 1908, Serial No. 391,658. Application for reissue filed June 24, 1910. Serial No. 568,818.

*To all whom it may concern:*

Be it known that I, HARRY PIERCE, a citizen of the United States, residing at Kansas City, in the county of Jackson and State of Missouri, have invented certain new and useful Improvements in Valve Systems and Tracker-Boards, of which the following is a specification.

This invention relates to pneumatically actuated musical instrument players, particularly of the keyboard playing type that are designed to be attached to a piano and automatically play the same under the control of specially devised music sheets mounted to pass over a tracker range, although it is to be understood that the invention is applicable also to mechanically controlled musical instruments of this character in which the entire mechanism is incorporated within the case of such instrument and embodies auxiliary wippens or equivalent accessories arranged to swing the hammers against the strings. These piano players as first constructed were mechanical in tone as well as in name, for the reason that no means were provided for properly bringing out the theme or melody of the composition being rendered, and consequently they could be readily distinguished, even by those who were not trained or cultured musicians, from a manually operated instrument, by their lack of tone color or capability of accenting any one or more notes at the desired or predetermined intervals to properly emphasize the theme; and this was a fault that hindered the more universal recognition of the musical value of the automatic piano players, notwithstanding the expression appliances that were employed and the high degree of technique that the mechanical elements made possible. To overcome this deficiency, it has heretofore been proposed to divide the vacuum chest into two grand divisions, controlling the treble and bass clefs respectively, and by cutting in either edge of the perforated music sheet allow air to enter a small hole in either side of the tracker range or board governed by such cuttings, and thereby create a greater suction upon that particular side of the instrument so as to accent the particular "note" which happens to register with the tracker board at that instant. It was thus possible to emphasize two notes at the same time, there being two compartments in each row of pneumatics in the vacuum chest; but it was not possible, by this construction, to single out one note above others on the same side of the center division line on the tracker board, should two or more perforations strike the tracker board at the same time on the same side of the division point. In other words, if two or more holes were to register with the tracker-board at the same time on the same side, these two or more notes would be accented. In order to overcome this, but at the risk of endangering the rhythmic effect, it has been proposed to cut the theme or accented notes in the roll or sheet a very small fraction behind the accompaniment cuttings.

In contradistinction to the foregoing and to obtain an artistic emphasis of the theme, my invention comprehends means for accenting any one or more notes, regardless as to how many strike the tracker board at the same time and independent of their position in the scale, and the invention, more specifically considered, comprises a specially constructed vacuum chest with each diaphragm pneumatic separated from the rest, a system of valves in addition to those heretofore ordinarily used and peculiarly correlated to the same, a specially constructed tracker board and peculiarly cut or perforated music rolls or sheets, the tracker-board and music sheet forming the subject matter of separate applications for Letters Patent.

The invention also consists in certain constructions, arrangements, and combinations of the parts that I shall hereinafter fully describe, and then point out the novel features and combinations thereof in the appended claims.

For a full understanding of the invention, reference is to be had to the following description and accompanying drawings, in which:

Figure 1 is a face view of a portion of a tracker board constructed in accordance with my invention; Fig. 2 is a transverse sectional view, in the nature of a diagram, illustrating my improved valve system in the simplest embodiment thereof, it being understood that in practice, as is customary, the valves of each vacuum chest or chamber will be arranged in two or three transverse rows for the sake of compactness; Fig. 3 is a view of a portion of the perforated music sheet employed; and, Fig. 4 is a front view, partaking of the nature of a longitudinal section, of the primary and secondary valve chests or vacuum chests of the ordinary double valve action automatic players, but arranged according to the principles of my invention.

Corresponding and like parts are referred to in the following description and indicated in all the views of the drawings by the same reference characters.

Referring to the drawings, and now more particularly to Fig. 2, the letter "T" designates my improved tracker board or range, across which the perforated music roll or sheet "M" is arranged to pass; "P" designates the primary vacuum chest of the ordinary double valve action pneumatic player, and "S" the secondary vacuum chest thereof, arranged in accordance with the principles of this invention; and "A" designates the additional or auxiliary vacuum chest which renders the theme emphasizing effects possible.

The tracker board T is provided with the usual longitudinally extending or elongated ports 1, each of which is connected by a flexible tracker tube 2 with the respective vacuum chamber 3 (Fig. 4) in the primary vacuum chest P, each chamber 3 being provided with a vent 4 and the chest P being connected to the pipe or tube 5 (Figs. 2 and 4) leading to the suction bellows (not shown). Each chamber 3 is in communication with a diaphragm pneumatic 6 underneath the double action valve 7. A tube 8 leads from above the lower head of said valve to the secondary vacuum chest S underneath and in communication with a diaphragm 9, adapted to actuate its valve 10.

11 designates the ordinary power pneumatic of the bellows type, designed to actuate the suspended finger or rod 12 so as to depress the key.

The foregoing parts are, as thus far described, of the usual formation. In their practical operation, whenever a port or passage 1 of the tracker board is closed by a perforated music sheet, a partial vacuum exists in the tube 2 created through the vent 4, and the suction is transmitted through the chamber $3^a$, and tube 8 to the diaphragm 9. A partial vacuum also exists in the chamber $9^a$ above the diaphragm pneumatic 9. This causes the valve 10 to be so held as to admit atmospheric air into the power pneumatic 11, the valve 7 closing the chest P against the admission of atmospheric air.

Whenever the perforated music sheet M opens the port 1, it destroys the equalization, causing the valve 7 to rise and admit atmospheric air into the chest P and to the tube 8. Air rushing into said tube will manifestly raise the valve 10, closing the upper valve and opening the lower valve, thereby causing the power pneumatic 11 to close, air being emptied through the chamber $9^a$, the pipe 17 connected at one end thereto, the chamber 16 and exhaust or suction pipe 5 that is connected to the pumping bellows, this exhaust being controlled by the regulator 18. Hence a soft or unaccented tone will be produced, it being understood that the valve 14 is lowered during this operation, the tube $2^a$ being closed Referring now to Fig. 1, wherein is illustrated my improved tracker board, it will be seen that the same is provided, in addition to the usual ports 1, with a correlated series of transversely extending ports $1^a$ extending back of and in line with one end of the said ports 1, respectively. A tracker tube $2^a$ leads from each one of these ports $1^a$, to the auxiliary vacuum chest A and communicates with a diaphragm 13 underneath the double valve 14, governing the communication of chambers 15 and 16 with chamber $9^a$ by means of the pipe 17. 18 designates a regulator of the well known type designed to control the tension by means of the valve 19.

In describing the operation of the additional vacuum chest of my invention in connection with the other parts, it is to be understood that the music sheet to be employed is especially formed with a set of accenting openings $y$ (see Fig. 3) in addition to the ordinary cuttings $x$. So long as the ports 1 and $1^a$ in the tracker board are closed by the perforated music sheet, there is the same partial vacuum in the channels of the chest P, as before stated, to the diaphragm 9 in chest S; but the vacuum in the chamber $9^a$ is created through pipe 17 to chest A, through chamber or channel 16, through the passage 20 controlled by the regulator 18, and through the pipe 5 to the pumping bellows. The vacuum between passages 20 and chamber $9^a$ is subdued and controlled by the bellows 18 and the slide valve 19. This gives weak suction or expression from chamber $9^a$ through pipe 17 and chamber 16 through the passage 20. There is strong suction or high tension through the channels of the chest P from the diaphragm 9 and through the pipe 5 from the chamber 15, giving the valve in the vacuum chest P positive action, although the secondary or power pneumatic 11 and valve 10 are on soft expression.

Whenever the perforation in the music sheet opens a port $1^a$ in the tracker board, atmospheric pressure rushes through the tube $2^a$, destroying the equalization under the diaphragm 13, lifting the valve 14, closing the chamber 16, and opening chamber 15, thereby switching the tension from that in the chamber 16 (said tension being regulated by a bellows 18) to the direct unregulated tension in the chamber 15 and creating a strong suction through the pipe 17 from the chamber $9^a$. This gives said chamber $9^a$ the same suction as under the diaphragm 9. Whenever, however, this same perforation in the music sheet extends over a port 1 in the tracker board, as well as a port $1^a$ atmospheric pressure will rush through the tube 2 into the chest P, destroying equalization under the diaphragm 6, raising the valve 7, and thereby admitting atmospheric pressure through the tube 8 so as to destroy the exhaust under the diaphragm 9. The latter being then raised, lifts the valve 10, and effects the closing of the pneumatic 11 with added force, the note thereby being accented.

Fig. 4 illustrates a longitudinal sectional view of the ordinary primary and secondary vacuum or valve chests of an ordinary double valve action player. It is to be understood that the vacuum is ordinarily created in the pipe or channel 5 from the pumping bellows through each end of the sections or grand divisions of the valve chest for the bass and treble portions, to the middle division D ordinarily employed. In order to separate each individual diaphragm 9 for action in connection with my improved auxiliary vacuum chest A above described, the said diaphragms 9 are separated from each other by the divisions $D^1$, the pipes 17 leading into the valve chest S above the respective diaphragms 9, as indicated at $17^a$.

Having thus described the invention, what I claim as new is:

1. In combination, a tracker board formed with two sets of air ports, a primary valve chest connected to one set of ports, power pneumatics, a secondary valve chest operatively connected to said pneumatics and having connection with the primary valve chest, an auxiliary valve chest having air passage connection with the secondary valve chest, means for exhausting air from the auxiliary valve chest and from the connection between the same and the secondary valve chest, tension regulators included in the air exhausting means, the auxiliary valve chest being provided with air passages leading directly from its connection with the secondary valve chest to the air exhausting means around the tension regulators, valves in said auxiliary valve chest, said valves normally closing said last named passages and opening the passage from the connection between said valve chest and the secondary valve chest to the tension regulators, and a connection between said auxiliary valve chest and the other set of ports in the tracker board, arranged upon the opening of any port of said set to shift one of said valves so as to admit the air directly from the secondary valve chest to the air exhausting means.

2. The combination of a tracker formed with two air ports for each note, of power pneumatics, primary and secondary valve mechanisms connected to each other and the latter to the power pneumatics, the primary valve mechanism being connected to one of said ports, an auxiliary valve chest connected to the other of said ports and to the secondary valve mechanism, means for normally exhausting the air from the secondary valve mechanism under regulated tension through the auxiliary valve chest, and means for exhausting the air from said secondary valve mechanism through the auxiliary valve chest unregulated and direct upon the opening of one of said ports.

3. The combination with a tracker board formed with two sets of air ports, the ports of one set being elongated transversely to the travel of the sheet and the ports of the other set being elongated longitudinally of the travel of the sheet and in alinement with the ends of corresponding ports of the first mentioned set, of power pneumatics, primary and secondary valve mechanism connected to the set of transversely elongated ports, an auxiliary valve chest connected to said other set of ports and to the secondary valve mechanism under regulated tension, and means for exhausting air from said secondary valve mechanism through the auxiliary valve chest unregulated and direct upon the opening of the ports of one of said sets.

4. The combination of a tracker having passages extending through it as separate ducts, which terminate in the music sheet face of the tracker as front and rear ports, which are arranged in groups, a group for each note with a front and a rear port in each group, whereof parts of the front ports are in alinement with the associated rear ports, and other parts of said front ports are to one side of said rear ports, said rear ports being wholly in the rear of the associated front ports, note sounding mechanism, mechanism for varying the volume of tone produced by said note sounding mechanism, and conduits extending respectively between said ports and said note sounding and tone varying mechanism.

5. The combination of a tracker having passages extending through it as separate ducts, which terminate in the music sheet face of the tracker as front and rear ports, which are associated with one another in groups, a group for each note whereof a front and rear port are included in each group, parts of the front ports being in alinement with assocated rear ports, and other parts of the front ports being to one side of said rear ports, said rear ports being wholly in the rear of associated front ports, note sounding and tone-varying mechanisms and conduits extending respectively between the front ports and the note sounding mechanism, and between the rear ports and the tone varying mechanism.

6. The combination with a tracker having a series of main ports and a series of transversely elongated supplemental ports in the rear of said main ports, of means for sounding and accenting notes, connected with said ports.

7. The combination with a tracker having a series of longitudinally elongated main ports and a series of transversely elongated supplemental ports in the rear of the main ports, the main ports overlapping the supplemental or rear ports, of means for sounding notes connected with one of said series of ports, and means for causing the accentuation of notes, connected with the other series of ports.

8. The combination with a tracker having a series of main ports and a series of transversely elongated supplemental ports in the rear of the main ports, said main ports overlapping the rear or supplemental ports, of means for sounding notes connected with one of said series of ports, and means for causing the accent of notes, connected with the other series of ports.

9. The combination with a tracker having a series of longitudinally elongated main ports and a series of transversely elongated supplemental ports arranged in the rear or ends of the main ports, of means for sounding notes connected with said main ports, and means for causing the accentuation of notes, connected with said supplemental ports.

10. A tracker-board formed with a series of longitudinally elongated air ports and a series of transversely elongated air ports back of the air ports of the first named series, each of the transversely elongated ports being in transverse alinement with a portion of the corresponding longitudinally elongated port, separate conduits extending from each of the transversely elongated ports and from each of the longitudinally elongated ports, means connected with the conduits of the longitudinally elongated ports for causing the sounding of notes, and means connected with the conduits of the transversely elongated ports for varying the volume of tone produced by the sounding of said notes, and a music sheet having two kinds of perforations, one of which is adapted to open longitudinally elongated ports only and the other of which is adapted to open both longitudinally elongated and transversely elongated ports.

11. The combination with a tracker having a series of main ports and a series of transversely elongated supplemental ports in the rear of the main ports, of note sounding mechanism connected with the main ports and mechanism for controlling the action of said mechanism to produce accent effects connected with the supplemental ports.

12. The combination with a tracker having a series of longitudinally elongated main ports, and a series of transversely elongated supplemental ports in the rear of the main ports, of a series of power pneumatics for tone sounding purposes having valve mechanism connected with the main ports of the tracker, and a series of supplemental or switching valves connected with the supplemental ports and arranged in combination with mechanism for supplying high or low wind tension to operate the power pneumatics.

13. The combination with a tracker having a series of main ports and a series of transversely elongated supplemental ports, of a series of main tone sounding pneumatics having valve mechanism connected with the main ports, and a series of supplemental pneumatics having valve mechanism connected with the supplemental ports, and means for varying the strength of blow of said tone sounding pneumatics.

14. The combination with a tracker having a series of longitudinally elongated main ports and a series of transversely elongated supplemental ports, in the rear of the main ports, of means for sounding and accenting notes connected with said ports.

15. The combination of a tracker having a series of groups of ports, one group for each note, including a front and a back port in each group, the ports of each group being wholly out of alinement transversely of the tracker with the ports of adjacent groups, a music sheet having perforations, some of which are adapted to open one port only of a group and others of which are each adapted to open more than one of the ports of a group, said perforations being of uniform width throughout their length, and mechanism for sounding and accenting tones connected with said ports.

16. The combination of a tracker having a series of groups of ports, one group for each note, including a front and a back port in each group, the ports of each group being wholly out of alinement transversely of the tracker with the ports of adjacent groups, a music sheet having perforations some of which are adapted to open the front ports only of groups and others of which are each adapted to open front and rear ports of the groups, said perforations being of uniform width throughout their length, and means for sounding and accenting tones connected with said ports.

17. The combination of a tracker having a series of groups of ports, one group for each note, including a front and a back port in each group, the ports of each group being wholly out of alinement transversely of the tracker with the ports of adjacent groups, blow striking pneumatics and valve mechanism connected with the front ports of said groups, intensity varying pneumatic mechanisms connected with the rear ports of said groups and a music sheet having perforations adapted to open front ports only and other perforations each adapted to open both front and rear ports of the same group.

18. The combination of a tracker having front and rear apertures arranged in groups, with a front and a rear aperture in each group, a music sheet having perforations adapted to open a front port only of a group, and other perforations adapted to open a rear port of a group and subsequently a front port thereof, and mechanism for sounding and accenting tones connected with said ports.

19. The combination of a tracker having front and rear apertures arranged in groups, with a front and a rear aperture in each group, a music sheet having perforations some of which are adapted to open the front ports only of groups, and others of which are adapted to open the rear ports of groups and subsequently the corresponding front ports thereof, holding the rear ports open until the corresponding front ports are opened, means for sounding tones connected with said front ports, and means whereby said tones are modified, connected with said rear ports.

20. The combination of a tracker having a row of transversely elongated apertures and a row of longitudinally elongated apertures, the transversely elongated apertures being nearer the side of the tracker approached by the music sheet than the other row of apertures, and being in alinement with end portions of said longitudinally elongated apertures, a music sheet having perforations adapted to open longitudinally elongated apertures only, and also having other perforations adapted to open both transversely and longitudinally elongated apertures, and mechanism for sounding and accenting tones connected with said apertures.

In witness whereof I hereunto subscribe my name this 16th day of June, 1910.

HARRY PIERCE.

Witnesses:
G. H. STUKENBERG,
E. K. CORBETT.

Copies of this patent may be obtained for five cents each, by addressing the "Commissioner of Patents, Washington, D. C."